United States Patent
Friesen et al.

(10) Patent No.: US 11,566,764 B2
(45) Date of Patent: Jan. 31, 2023

(54) HOLDING DEVICE OF A LIGHTING MODULE OF A LIGHTING UNIT, LIGHTING MODULE, AND LIGHTING UNIT OF A VEHICLE

(71) Applicant: HELLA GmbH & Co. KGaA, Lippstadt (DE)

(72) Inventors: Paul Friesen, Rheda-Wiedenbrueck (DE); Joerg Sieme, Georgsmarienhuette (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/474,947

(22) Filed: Sep. 14, 2021

(65) Prior Publication Data

US 2021/0404619 A1    Dec. 30, 2021

Related U.S. Application Data

(63) Continuation of application No. PCT/EP2020/055498, filed on Mar. 3, 2020.

(30) Foreign Application Priority Data

Mar. 14, 2019  (DE) ...................... 10 2019 106 492.9

(51) Int. Cl.
  *F21S 41/19*   (2018.01)
  *F21S 45/47*   (2018.01)
  (Continued)

(52) U.S. Cl.
  CPC ............. *F21S 41/192* (2018.01); *F21S 45/47* (2018.01); *F21V 19/0055* (2013.01);
  (Continued)

(58) Field of Classification Search
  CPC ........ F21S 41/19; F21S 41/198; F21S 41/657; B60Q 1/0408; B60Q 1/0441;
  (Continued)

(56) References Cited

U.S. PATENT DOCUMENTS 4,142,228 A   2/1979   Kumagai et al.
4,318,161 A   3/1982   Shanks
(Continued)

FOREIGN PATENT DOCUMENTS

DE   1017036 B    10/1957
DE   2327119 A1   12/1974
(Continued)

OTHER PUBLICATIONS

International Search Report dated Jun. 3, 2020 in corresponding application PCT/EP2020/055498.

*Primary Examiner* — Colin J Cattanach
(74) *Attorney, Agent, or Firm* — Muncy, Geissler, Olds & Lowe, P.C.

(57) ABSTRACT

A holding device of a lighting module of a lighting unit of a vehicle, comprising a securing section for securing the holding device to the rest of the lighting module and a bearing section for supporting the holding device on a bearing pin of the lighting unit, wherein the bearing section has at least one lock which forms a locking connection together with the bearing pin when the holding device is assembled, and wherein the lock is designed such that the locking connection simultaneously forms a joint which enables the lighting module to rotate about a longitudinal axis of the bearing pin. A lighting module and a lighting unit of a vehicle are also provided.

10 Claims, 3 Drawing Sheets

(51) Int. Cl.
  *F21V 19/00* (2006.01)
  *B60Q 1/04* (2006.01)
  *B60Q 1/068* (2006.01)
  *B60Q 1/072* (2006.01)
  *B60Q 1/06* (2006.01)
  *F21S 41/657* (2018.01)
  *B60Q 1/076* (2006.01)
  *F21V 21/088* (2006.01)

(52) U.S. Cl.
  CPC ............ *B60Q 1/045* (2013.01); *B60Q 1/0408* (2013.01); *B60Q 1/0416* (2013.01); *B60Q 1/0425* (2013.01); *B60Q 1/0441* (2013.01); *B60Q 1/0458* (2013.01); *B60Q 1/0483* (2013.01); *B60Q 1/06* (2013.01); *B60Q 1/068* (2013.01); *B60Q 1/0683* (2013.01); *B60Q 1/072* (2013.01); *B60Q 1/076* (2013.01); *F16C 2226/74* (2013.01); *F21S 41/19* (2018.01); *F21S 41/198* (2018.01); *F21S 41/657* (2018.01); *F21V 21/088* (2013.01)

(58) Field of Classification Search
  CPC .... B60Q 1/0425; B60Q 1/0416; B60Q 1/045; B60Q 1/0458; B60Q 1/0483; B60Q 1/06; B60Q 1/068; B60Q 1/0683; B60Q 1/072; B60Q 1/076; F21V 21/088; F16C 2226/74
  See application file for complete search history.

(56) References Cited

U.S. PATENT DOCUMENTS

| | | | |
|---|---|---|---|
| 4,722,029 A | 1/1988 | Ahie et al. | |
| 5,270,907 A * | 12/1993 | Lisak | B60Q 1/06 362/528 |
| 5,360,282 A * | 11/1994 | Nagengast | F16C 11/069 403/119 |
| 6,692,176 B1 * | 2/2004 | Fladhammer | F16C 11/0695 403/135 |
| 9,476,555 B2 | 10/2016 | Brendle et al. | |
| 2003/0143019 A1 * | 7/2003 | Wisler | B60Q 1/0483 403/135 |
| 2004/0090786 A1 * | 5/2004 | Floyd | B60Q 1/06 362/460 |
| 2010/0014301 A1 | 1/2010 | Demarois | |
| 2015/0224914 A1 * | 8/2015 | Hasbrook | B60Q 1/0017 362/523 |
| 2016/0368412 A1 * | 12/2016 | Shibata | F21S 45/48 |
| 2017/0334343 A1 * | 11/2017 | Kastanis | B60Q 1/2665 |

FOREIGN PATENT DOCUMENTS

| | | | | |
|---|---|---|---|---|
| DE | 2723424 A1 | 12/1977 | | |
| DE | 3509831 C2 * | 4/1994 | ........... | B60Q 1/0683 |
| DE | 69806445 T2 | 3/2003 | | |
| DE | 102006002322 A1 | 12/2007 | | |
| DE | 102006027460 A1 | 12/2007 | | |
| DE | 102010038569 A1 * | 2/2012 | ........... | B60Q 1/045 |
| DE | 102011081062 A1 | 2/2013 | | |
| EP | 0225480 A1 | 6/1987 | | |
| EP | 2279907 A1 * | 2/2011 | ........... | B60Q 1/0408 |
| EP | 2327926 A1 | 6/2011 | | |
| EP | 2488390 B1 | 7/2016 | | |
| FR | 3051883 A1 * | 12/2017 | ........... | B60Q 1/0425 |

* cited by examiner

HOLDING DEVICE OF A LIGHTING MODULE OF A LIGHTING UNIT, LIGHTING MODULE, AND LIGHTING UNIT OF A VEHICLE

This nonprovisional application is a continuation of International Application No. PCT/EP2020/055498, which was filed on Mar. 3, 2020, and which claims priority to German Patent Application No. 10 2019 106 492.9, which was filed in Germany on Mar. 14, 2019, and which are both herein incorporated by reference.

BACKGROUND OF THE INVENTION

Field of the Invention

The present invention relates to a holding device for a lighting module of a lighting unit, to a lighting module, and to a lighting unit of a vehicle.

Description of the Background Art

Holding devices for lighting modules, lighting modules of lighting units, and lighting units for vehicles are already known from the state of the art in numerous design variants.

This is the starting point for the invention at hand.

SUMMARY OF THE INVENTION

It is therefore an object of the present invention to improve a mount for a lighting module of a lighting unit of a vehicle.

An essential advantage of the invention is in particular that a mounting of a lighting module of a lighting unit of a vehicle is improved. It is possible via the invention to realize the mounting of a lighting module of a lighting unit of a vehicle much more compactly and with fewer components. Accordingly, the invention can also be used advantageously in lighting units with limited installation space.

In principle, the holding device of the invention can be freely selected within wide, suitable limits in terms of type, function, material, dimensioning, and arrangement. An advantageous refinement of the holding device of the invention provides that the holding device is formed in one piece. In this way, the holding device is further scaled down in the number of components required. Transport, storage, and assembly of the holding device of the invention are accordingly simplified.

An advantage of the holding device of the invention provides that the holding device is formed from a spring steel sheet, therefore, a sheet metal part made from spring steel. Spring steel has a high strength compared to other steels.

A further advantage of the holding device of the invention provides that the bearing section has a positioning aid for positioning the holding device along the longitudinal axis of the bearing pin. As a result, a previously determined and thus correct position of the holding device relative to the bearing pin along its longitudinal axis is ensured even under difficult operating conditions.

An advantage of the holding device of the invention provides that the positioning aid is designed such that the holding device bears resiliently against a positioner of the bearing pin via the positioning aid. In this way, a certain tolerance compensation between the bearing pin on the one side and the holding device on the other side is made possible.

Another advantage of the holding device of the invention provides that the at least one lock has at least three spring tabs. This enables a secure locking connection between the holding device and the bearing pin in the assembled state of the holding device. In the case of a limitation to three spring tabs, further an alignment of the individual spring tabs with respect to one another is improved and simplified.

The securing section can have two positioning aids for positioning the holding device relative to a reference part of the lighting module. In this way, a desired alignment of the lighting module relative to the bearing pin and thus relative to the lighting unit is ensured via the holding device with structurally simple means. This relative alignment of the holding device to the reference part of the lighting module is very important for proper functioning of the lighting module. Via the positioning aids, the holding device of the invention can be referenced to the reference part of the lighting module, so that component tolerances do not lead in an undesirable manner to misalignments of the lighting module when joining the holding device on the one side and the rest of the lighting module on the other side.

The lighting module can have two positioners to position the holding device relative to the reference part of the lighting module, wherein the two positioners are each formed to correspond to one of the two positioning aids of the securing section of the holding device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
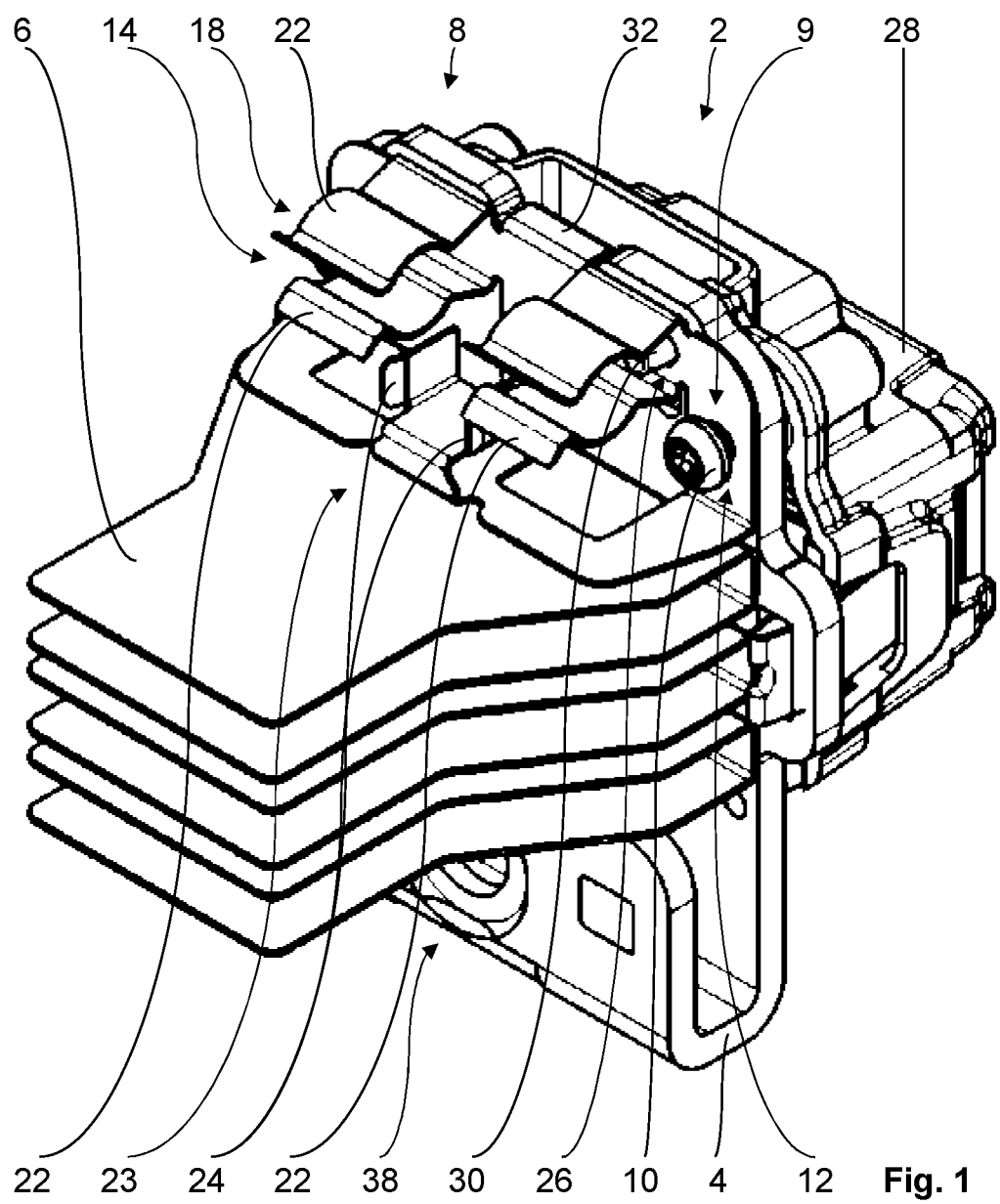
FIG. 1 shows an exemplary embodiment of the lighting module of the invention of a lighting unit of a vehicle in a perspective illustration.

An exemplary embodiment of the lighting module of the invention of a lighting unit of a vehicle is shown in FIG. 1. The vehicle is designed as a passenger car and the lighting unit is designed as a vehicle headlight.

Lighting module 2 has a plate-like cooling body 4 with cooling fins 6 arranged thereon. Further, lighting module 2 has a holding device 8, wherein holding device 8 is screwed tightly to cooling body 4 via mounting holes 9 in holding device 8 and by fixing screws 10 corresponding thereto. In the present exemplary embodiment, holding device 8 is formed in one piece and is made from a spring steel sheet, therefore, a single sheet metal part made of spring steel.

Figure 3:
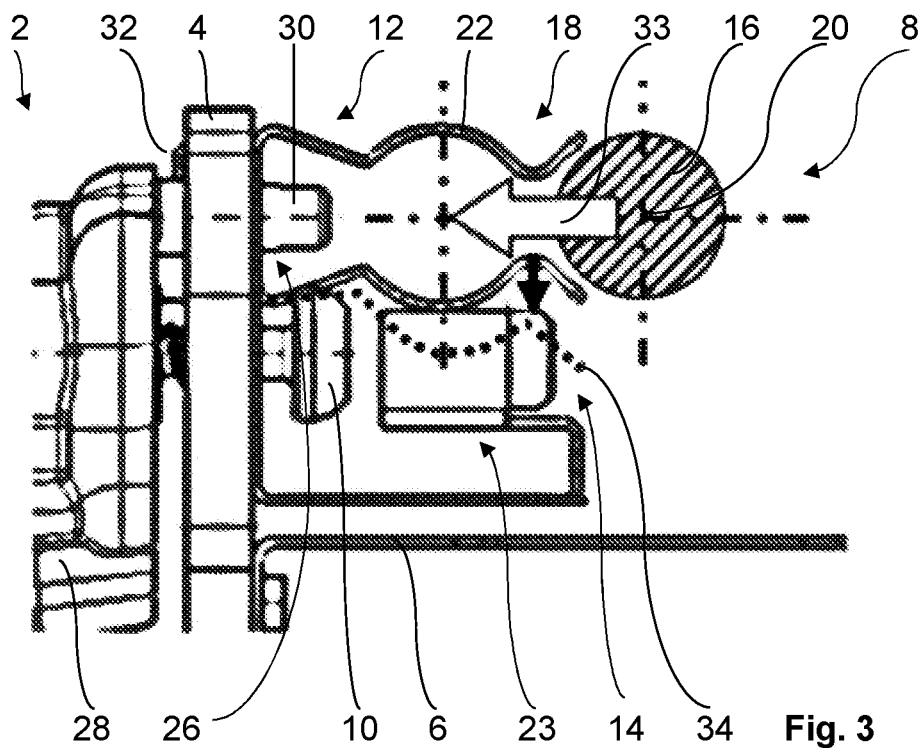
FIG. 3 shows the exemplary embodiment from FIG. 1 in a further partial side view when the holding device of the lighting module is brought into its assembled state.

Holding device 8 comprises a securing section 12 for securing holding device 8 to cooling body 4 of lighting module 2 and a bearing section 14 for supporting holding device 8 on a bearing pin 16 of the lighting unit, said pin being shown only in FIG. 3, wherein bearing section 14 has a lock 18 which forms a locking connection together with bearing pin 16 in an assembled state of holding device 8. Lock 18 is designed such that the locking connection simultaneously forms a joint which enables lighting module 2 to rotate about a longitudinal axis 20 of bearing pin 16. See FIG. 3.

As can be clearly seen from FIG. 1, lock 18 has a total of four spring tabs 22, wherein two of the four spring tabs 22 each form a pair of spring tabs engaging around bearing pin 16 in the assembled state of holding device 8. See also FIG. 3 on this point in which holding device 8 is shown when it is brought into its assembled state.

Bearing section 14 of holding device 8 further has a positioning aid 23 for positioning holding device 8 along longitudinal axis 20 of bearing pin 16, wherein holding device 8 in its assembled state bears resiliently against a positioner of bearing pin 16 via positioning aid 23. The positioner of bearing pin 16 is formed as a projection formed on bearing pin 16 and perpendicular to longitudinal axis 20 of bearing pin 16. Positioning aid 23 has two lateral wings 24 for the purpose of the resilient bearing of the positioner of bearing pin 16 against positioning aid 23.

In addition, securing section 12 of holding device 8 has two positioning aids 26 for positioning holding device 8 relative to a reference part of lighting module 2. In the present exemplary embodiment, the two positioning aids 26 are each formed as a circular opening. The reference part of lighting module 2 is formed as a cover frame 28 of lighting module 2, wherein all parts of lighting module 2 relevant to the light function of lighting module 2 are positioned, therefore, aligned, relative to cover frame 28 of lighting module 2.

Correspondingly, all parts relevant for the light function of lighting module 2 as well as holding device 8 reference the reference part, namely cover frame 28 of lighting module 2. Two positioners formed and arranged to correspond to the aforementioned positioning aids of holding device 8, therefore, openings 26, are formed on the reference part, therefore, cover frame 28. The positioner of cover frame 28 are formed as positioning pins 30.

Figure 2:
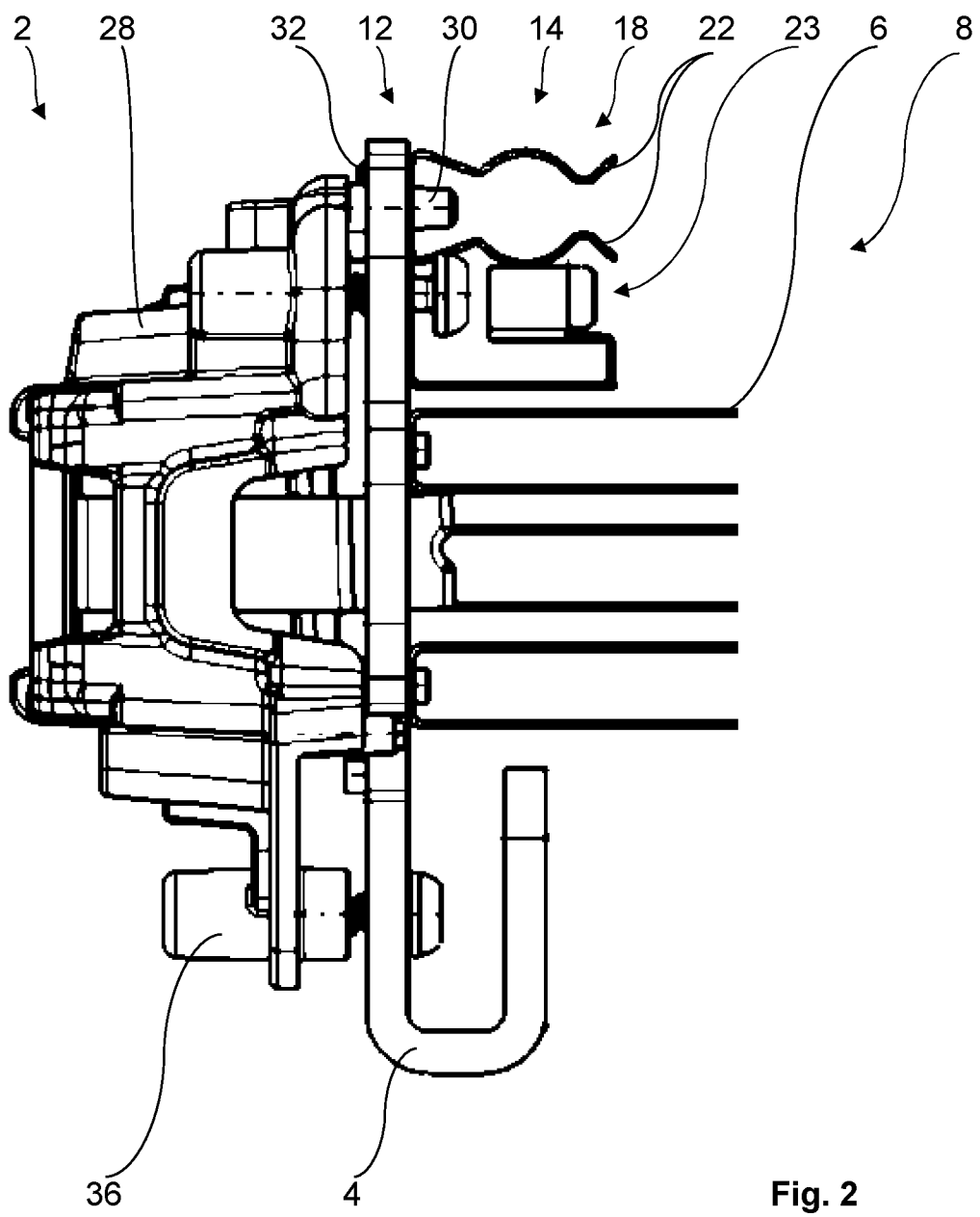
FIG. 2 shows the exemplary embodiment from FIG. 1 in a partial side view.

The holding device of the invention, the lighting module of the invention, and the lighting unit of the invention for a vehicle according to the present exemplary embodiment and their mode of operation are explained in more detail hereinbelow with reference to FIGS. 1 to 3.

First of all, holding device 8 and the rest of lighting module 2 are separate parts. For the purpose of securing holding device 8 of lighting module 2 to the rest of lighting module 2, holding device 8 is first plugged onto the edge of cooling body 4, shown above in the planes of the figures in FIGS. 1 to 3, via a securing bracket 32. In this case, holding device 8 is simultaneously aligned in the desired manner relative to the reference part of lighting module 2, namely cover frame 28, because holding device 8, via its openings 26, is plugged onto the positioner of cover frame 28, which are formed as positioning pins 30 and protrude through corresponding openings in cooling body 4. The aforementioned openings in cooling body 4 are not shown.

Holding device 8 now bears in the desired manner against cooling body 4 of lighting module 2 and holding device 8 is screwed to cooling body 4 via a total of four fixing screws 10. Thus, on the one hand, holding device 8 is fixed to cooling body 4. On the other hand, holding device 8 is aligned in the desired manner relative to the reference part of lighting module 2, namely cover frame 28.

For the purpose of holding lighting module 2 on bearing pin 16 of the lighting unit of the vehicle, holding device 8 is brought into its assembled state; see in particular FIG. 3 on this point. In this case, holding device 8 is pushed onto bearing pin 16 by lock 18, therefore, the four spring tabs 22 arranged in pairs, such that spring tabs 22 of holding device 8 form a locking connection with bearing pin 16 in the assembled state of holding device 8. The bringing of holding device 8 into its assembled state is shown in FIG. 3, wherein arrow 33 symbolizes the direction of movement of bearing pin 16 relative to holding device 8. The interim deflection of spring tabs 22 of holding device 8 during the aforementioned bringing into the assembled state of holding device 8 is symbolized by a dotted line 34 in FIG. 3.

As already stated above, holding device 8 has positioning aid 23, which corresponds to the positioner formed on bearing pin 16. Accordingly, positioning aid 23 of holding device 8 on the one side and the positioner of bearing pin 16 on the other side come into engagement with one another when holding device 8 is brought into its assembled state, so that holding device 8 in the assembled state is aligned parallel in the desired manner, therefore, longitudinally, to longitudinal axis 20 of bearing pin 16. Wings 24 of positioning aid 23 of holding device 8 bear resiliently against the positioner of bearing pin 16.

After holding device 8 has been brought into its assembled state, lighting module 2 is fixed via holding device 8 on bearing pin 16 so as to be rotatable about longitudinal axis 20 of bearing pin 16. Accordingly, lock 18 of holding device 8 forms a locking connection with bearing pin 16 in the assembled state of holding device 8, which connection at the same time forms a joint that enables rotation of lighting module 2 about longitudinal axis 20 of bearing pin 16. Accordingly, in the assembled state of holding device 8, it is possible to align lighting module 2 in a manner known to the skilled artisan relative to the lighting unit, of which only bearing pin 16 is shown in FIG. 3.

For this purpose, cover frame 28 of lighting module 2 has an adjusting screw connection 36 which can be operated via a screwdriver. In so doing, the screwdriver can be inserted into the adjusting screw of adjusting screw connection 36 via an opening 38 in cooling body 4 of lighting module 2. Accordingly, lighting module 2 can be pivoted in the respective image plane of FIGS. 2 and 3 about longitudinal axis 20 of bearing pin 16, an axis which is only shown in FIG. 3, up to a desired deflection. Lighting module 2 is then locked in the desired deflection via the adjusting screw connection.

Figure 4:
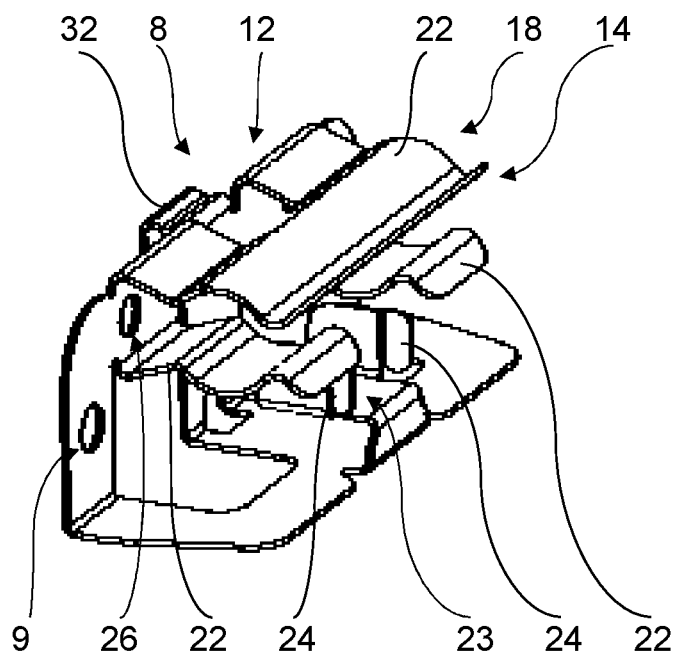
FIG. 4 shows an embodiment of the holding device in a perspective illustration.

An alternative design of the holding device is shown in FIG. 4. The same or identically acting components are given the same reference characters. The alternative design of holding device 8 shown in FIG. 4 corresponds substantially to the design according to the above statements with reference to FIGS. 1 to 3. Accordingly, reference can largely be made to the statements above. The alternative embodiment of holding device 8 is thus only explained to the extent of the differences from holding device 8 according to FIGS. 1 to 3.

As can be seen from FIG. 4, bearing section 14 of holding device 8 has only three spring tabs 22. Spring tabs 22 shown at the bottom in the image plane of FIG. 4 are formed analogously to FIGS. 1 to 3. Spring tabs 22 shown above in the image planes of FIGS. 1 to 3 are replaced in the embodiment of holding device 8 according to FIG. 4 by a single, elongated spring tab 22, wherein said elongated spring tab 22 extends along longitudinal axis 20 of bearing pin 16 in the assembled state of holding device 8. In the alternative according to FIG. 4, the positioner formed on bearing pin 16 is adapted accordingly in order to come into engagement with positioning aid 23 when this holding device 8 is brought into the assembled state.

The invention is not limited to the present exemplary embodiment. For example, the invention can also be used advantageously in other vehicles. The lighting unit of the invention can also be formed, for example, as a vehicle light.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A holding device of a lighting module of a lighting unit of a vehicle, the holding device comprising:
    a securing section to secure the holding device to the lighting module; and
    a bearing section to support the holding device on a bearing pin of the lighting unit,
    wherein the bearing section has at least one lock that forms a locking connection together with the bearing pin when the holding device is assembled,
    wherein, in an assembled state of the holding device to the lighting module, the at least one lock is designed such that the locking connection simultaneously forms a joint which enables the holding device and the lighting module to rotate clockwise and counterclockwise about a longitudinal axis of the bearing pin,
    wherein the at least one lock has at least three spring tabs,
    wherein the securing section has two positioning aids that are each formed as a through hole,
    wherein a reference part of the lighting module has two positioners that are each formed as a positioning pin,
    wherein each positioning pin of the lighting module is positioned so as to correspond to, and be inserted through, each through hole of the securing section, respectively, so that the holding device is positioned relative to the reference part of the lighting module, and
    wherein each through hole of the securing section is provided between two opposing spring tabs of the at least three spring tabs of the bearing section.

2. The holding device according to claim 1, wherein the holding device is formed in one piece.

3. The holding device according to claim 2, wherein the holding device is formed from a spring steel sheet.

4. The holding device according to claim 1, wherein the bearing section has a positioning aid to position the holding device along the longitudinal axis of the bearing pin.

5. The holding device according to claim 4, wherein the positioning aid is designed such that the holding device bears resiliently against a positioner of the bearing pin via the positioning aid.

6. The holding device according to claim 4, wherein the positioning aid of the bearing section is provided below the at least one lock.

7. The holding device according to claim 6, wherein the positioning aid of the bearing section comprises laterally extending wings.

8. A lighting module of a lighting unit of a vehicle, comprising a holding device according to claim 1 to support the lighting module on a bearing pin of the lighting unit.

9. A lighting unit of a vehicle comprising:
    a lighting module according to claim 8; and
    a bearing pin to support the lighting module which, when the holding device is assembled, forms a locking connection together with the at least one lock of the bearing section of the holding device,
    wherein the bearing pin is designed such that the locking connection simultaneously forms the joint which enables the lighting module to rotate about the longitudinal axis of the bearing pin.

10. The holding device according to claim 1, wherein the two opposing spring tabs are convexly curved so as to conform to a contour of an outer cylindrical surface of the bearing pin, wherein a longitudinal extension of each of the at least two opposing spring tabs is parallel to the longitudinal axis of the bearing pin, such that when the bearing pin is accommodated between the at least two opposing spring tabs, the holding device and the lighting module are rotatable about the longitudinal axis of the bearing pin.

* * * * *